United States Patent [19]

Takagi et al.

[11] Patent Number: 4,708,406
[45] Date of Patent: Nov. 24, 1987

[54] HYDRAULIC BRAKING SYSTEM WITH MALFUNCTION ALARM JUNCTION

[75] Inventors: Kozi Takagi, Takahama; Ken Nomura, Okazaki; Yoshiyuki Hattori, Toyoake; Masahiko Kamiya, Anjo, all of Japan

[73] Assignee: Nippondenso Co., Ltd., Kariya, Japan

[21] Appl. No.: 915,099

[22] Filed: Oct. 3, 1986

[30] Foreign Application Priority Data

Oct. 4, 1985 [JP] Japan .................................. 60-222446
Oct. 4, 1985 [JP] Japan .................................. 60-222447
Jul. 30, 1986 [JP] Japan .................................. 61-179409

[51] Int. Cl.⁴ .......................... B60T 8/58; B60T 8/46; B60T 11/10
[52] U.S. Cl. .................................. 303/115; 192/3 H; 303/100
[58] Field of Search ............... 192/3 H, 3 TR, 13 A; 303/92, 93, 94, 20, 100, 110, 115, 116, 119; 188/181 A

[56] References Cited

U.S. PATENT DOCUMENTS 4,446,950 5/1984 Wise et al. ............................ 303/20

FOREIGN PATENT DOCUMENTS

59-149851 8/1984 Japan .

Primary Examiner—Andres Kashnikow
Assistant Examiner—T. Newholm
Attorney, Agent, or Firm—Cushman, Darby & Cushman

[57] ABSTRACT

A hydraulic braking system having an antiskid function and a holding function for keeping the vehicle immobile during vehicle stoppage is further provided with a malfunction alarm function wherein the components of the braking system are checked each time the holding function is performed and the operator is provided, directly or indirectly, with a warning in the event there is failure or malfunction of the components.

7 Claims, 8 Drawing Figures

HYDRAULIC BRAKING SYSTEM WITH MALFUNCTION ALARM JUNCTION

BACKGROUND OF THE INVENTION

1. Field of the Invention

This invention relates to a hydraulic braking system for a vehicle having an antiskid function whereby the hydraulic pressure at wheel cylinders thereof is modulated to prevent locking of the wheels as well as a holding function whereby the braking force is automatically maintained during vehicle stoppage, to make the vehicle immobile, and is automatically released upon operation by the operator to move the vehicle. More particularly, this invention relates to a hydraulic braking system having such dual functions, and further having a function of checking various components of the braking system and warning a vehicle operator with a visible or invisible alarm when any of the components have failed or are malfunctioning.

2. Description of the Related Art

Japanese Unexamined Patent Publication No. 59-149851, published Aug. 27, 1984, discloses a hydraulic braking system having a function of holding the vehicle immobile during stoppage (hereinafter referred to as holding function) in addition to an antiskid or antilock function. As illustrated in the figure thereof, the braking system includes a master cylinder 3 operated by a brake pedal 2 and connected through a hydraulic conduit 6 to wheel cylinders 5. The system is provided with a solenoid operated shutoff valve 7 located in the hydraulic conduit 6 and a solenoid operated second flow control valve 13 which is adapted to relieve the hydraulic pressure at the wheel cylinders when energized. In the antiskid control mode of the system, an antiskid control unit 9 controls the shutoff valve 7 and the control valve 13 to modulate the hydraulic pressure at wheel cylinders to avoid locking of the wheels and prevent the wheels from skidding. In the "holding" mode, upon sensing that the vehicle speed is zero, that the accelerator pedal is released, and that the clutch is disengaged, a cruise control unit 10 operates to close the shutoff valve 7, whereby the hydraulic pressure at the wheel cylinder is maintained, the brake remains applied, and the vehicle is kept immobile until the operator thereafter attempts to move the vehicle, for example, by engaging the clutch or pressing down the accelerator pedal.

In a hydraulic braking system of this nature having both a holding function and an antiskid control function, whenever the vehicle is stopped, the operator is able to determine whether or not the shutoff valve has functioned properly by checking if the vehicle is held immobile even though the brake pedal is released. However, the operator is unable to tell whether or not the antiskid control valve and associated hydraulic conduits are in a proper operable condition required for antiskid control.

SUMMARY OF THE INVENTION

The primary object of the invention is to improve the reliability of a hydraulic braking system having the above-mentioned holding and antiskid control functions. More specifically, the object of the invention is to provide a hydraulic braking system having the holding and antiskid control functions, which is capable of checking the components of the system upon each vehicle stoppage and providing the operator of the vehicle with a visible or invisible warning in the event that any of the system components have failed or are malfunctioning or are not operating under the normal conditions required for proper functioning of the system. The function of the system providing such capabilities will be referred to hereinafter as malfunction alarm function.

In one aspect thereof, the prevent invention provides a vehicle hydraulic braking system including a master cylinder, at least one wheel cylinder, a hydraulic conduit connected between the master cylinder and the wheel cylinder, a normally-open solenoid-operated shutoff valve disposed in the hydraulic conduit, and a pressure modulator with a solenoid-operated control valve. The system further includes an electronic control unit for controlling the shutoff valve and the control valve. In a condition in which the vehicle is to be kept immobile, the control unit delivers a first signal to the shutoff valve to cause the valve to move into a closed position, whereby the hydraulic pressure at the wheel cylinder is maintained to hold the vehicle immobilized. When the operator thereafter attempts to move the vehicle, the control unit issues a second signal to the control valve, for a predetermined time period. If the control valve functions properly, this causes the hydraulic pressure at the wheel cylinder to be relieved immediately. If not, the hydraulic pressure is maintained until the shutoff valve is returned to the normally open position after a lapse of the predetermined period. Accordingly, in the case of a failure or malfunction of the control valve, the brake remains applied for the predetermined time, thereby precluding vehicle movement. The operator becomes aware of this unusual condition, and thus realizes that there must be a malfunction in one or more of the components of the braking system. Accordingly, the operator is indirectly warned that the vehicle must be driven very carefully until it can be taken to an automotive service shop for repair or replacement of the failed component(s).

In another aspect, this invention provides a hydraulic braking system comprising a master cylinder, at least one wheel cylinder, a hydraulic conduit between the cylinders, a normally open shutoff valve, a pressure modulator including a solenoid operated control valve, and an alarm indicator capable of providing a visible or invisible warning. The system is provided with a pressure sensor for detecting the hydraulic pressure at the wheel cylinder. In this system, a control unit signals the shutoff valve to maintain the hydraulic pressure at the wheel cylinder in response to a condition in which the vehicle is to be held immobile. When the operator thereafter attempts to move the vehicle, the control unit energizes the control valve for a predetermined time to determine whether the control valve is operating properly. If not, the pressure sensor senses an unusually high hydraulic pressure at the wheel cylinder, due to the malfunction of the control valve, and the control unit energizes the alarm indicator to provide a positive warning to the driver. In this manner, the components of the braking system are checked each time the vehicle is stopped and a positive warning is provided in the event of a failure or malfunction any of the components.

These and other objects of the invention, as well as other advantages thereof, will becomes apparent from the following description.

DESCRIPTION OF THE PREFERRED EMBODIMENTS

Figure 1:
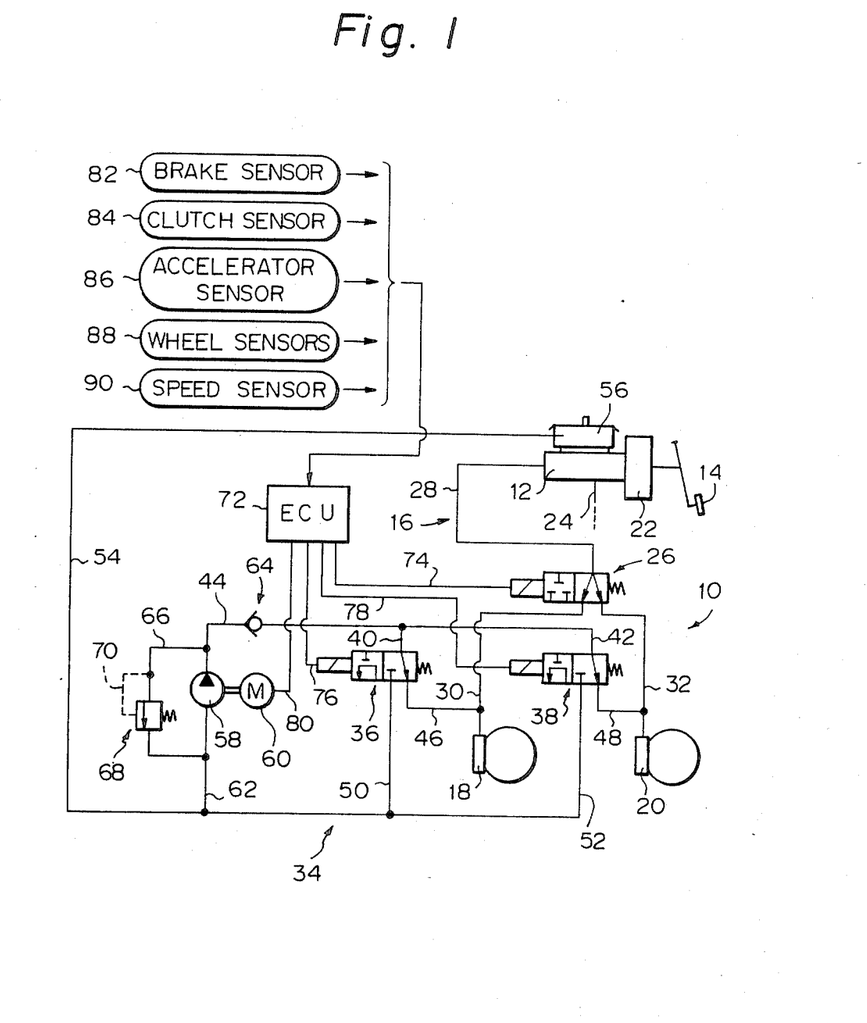
FIG. 1 is a diagrammatic representation of an embodiment of the hydraulic braking system according to the invention.

Referring to FIG. 1, the hydraulic braking system 10 is shown as applied to a font-engine rear-drive automobile. For simlplicity, only the hydraulic circuit for two front wheels is shown, the other hydraulic circuit for two rear wheels being substantially similar in structure to the front wheel circuit. In the illustrated embodiment, wheel cylinders associated with two front wheel brakes receive a brake fluid under pressure from a common supply conduit.

The braking system 10 includes a conventional master cylinder 12 which, upon actuation of a brake pedal 14, generates a hydraulic pressure which is transmitted through a hydraulic conduit 16 to a front right wheel cylinder 18 and a front left wheel cylinder 20 to apply the associated front wheel brakes. A conventional vacuum booster 22 may be provided which operates through an intake manifold vacuum of the engine to move a piston of the master cylinder 12 in response to the travel of the brake pedal 14 to assist the vehicle driver ingenerating the hydraulic pressure. The master cylinder 12 may be of the tandem type having two independent pressure chambers and outlet ports (not shown). The hydraulic conduit 16 for the front wheel cylinder 18 and 20 is connected to one of the outlet ports, and a hydraulic conduit 24, shown in part in FIG. 1, for the rear wheel cylinders is coupled to the other port.

The system 10 has a normally-open solenoid-operated 3-port 2-position shutoff valve 26 disposed in the hydraulic conduit 16. In the illustrated embodiment, the conduit 16 includes three sections; a section 28 extending between the outlet of the master cylinder 12 and an inlet of the valve 26, a section 30 between one of the outlet ports of the valve 26 and the front right wheel cylinder 18, and a section 32 between the other port of the valve 26 and the front left wheel cylinder 20. In FIG. 1, the shutoff valve 26 is shown as being in the normally open first position in which the brake fluid under pressure is transmitted to the wheel cylinders 18 and 20 to apply the front wheel brakes. In the second position of the valve 26, the conduits 30 and 32 are isolated from the conduit 28 to interrupt fluid communication between the master cylinder 12 and the wheel cylinders 18 and 20.

It will be understood that when the shutoff valve 26 is in the first position, braking of the vehicle may be performed in a usual manner by actuating the brake pedal 14.

The braking system 10 also includes a pressure modulator 34 required for the antiskid control function. The pressure modulator 34 has solenoid-operated 3-port 2-position control valves 36 and 38. The first ports of the control valves 36 and 38 are connected, respectively, to branches 40 and 42 of a supply conduit 44. The second ports of the valves are connected via respective conduits 46 and 48 to the conduits 30 and 32, respectively. The third ports of the control valves are connected through respective branch conduits 50 and 52 to a common return line 54 extending into a brake fluid reservoir 56 of the master cylinder 12. It will be understood that when the solenoids of the control valves 36 and 38 are energized to bring the valves into the second position in which the conduits 46 and 48 are communicated with the conduits 50 and 52, the hydraulic pressure at the wheel cylinders 18 and 20 is relieved to reduce the braking force.

The pressure modulator 34 further includes a hydraulic pump 58 driven by an electric motor 60. The pump 58 is adapted to draw the brake fluid in the reservoir 56 through the return line and a suction conduit 62 branched therefrom, and to deliver the fluid under pressure into the supply conduit 44. It will be understood that when the control valves 36 and 38 are in the first position shown in FIG. 1, the pressurized brake fluid from the pump 58 is forwarded to the wheel cylinders 18 and 20 to increase the hydraulic pressure therein. A check valve 64 is provided in the supply line 44 to prevent the brake fluid from flowing in the reverse direction. A bypass 66 having a pressure relief valve 68 is connected between delivery and suction sides of the pump 58. The delivery pressure of the pump is applied via a conduit 70 to the relief valve 68, which serves to control the delivery pressure to within a predetermined limit.

The hydraulic circuit for the rear wheels (not shown), including the rear hydraulic conduit 24, is generally similar to the above-described hydraulic circuit for the front wheels, except in that a conventional proportioning valve (not shown) is provided in the conduit 24. As is well known in the art, the proportioning valve serves to reduce the maximum pressure to the rear wheel cylinder when the master cylinder generates a high pressure.

The shutoff valve 26, the control valves 36 and 38, and the electric motor 60 are controlled by an electronic control unit (ECU) 72 through lines 74, 76, 78, and 80, respectively. The ECU 72 comprises a programmed microcomputer and receives signals from various sensors. These sensors may include a brake sensor 82 issuing a signal when the brake pedal is pushed down, a clutch sensor 84 which delivers a signal when the clutch is engaged, an accelerator sensor 86 which issues a signal when the accelerator pedal is actuated, wheel sensors 88 associated with the respective wheels to detect the rotational speed of the individual wheels, and a speed sensor 90 for detecting the vehicle speed.

The operation of the braking system 10 will be described below.

Referring first to the antiskid mode of operation, antiskid control is performed when it is determined that either one of the wheels tends to lock, that is, when the deceleration rate of wheel speed or the slip ratio becomes too large for either one of the wheels. Since all four wheels are controlled in the same manner, the antiskid function will be described hereinafter with reference to the front right wheel. During normal braking, the electric motor 60 for the pump 58 is deenergized and the shutoff valve 26 as well as the control valves 36 and 38 are deenergized to assume the first position shown in FIG. 1. Thus, the front right wheel cylinder 18 is in fluid communication with the master cylinder 12 so that the front right brake is applied in response to the actuation of the brake pedal 14. The check valve 64 in the conduit 44 serves to prevent release of the wheel cylinder pressure through the control valve 36.

The rotational speed of the front right wheel is sensed by the associated wheel sensor 88. If the front right wheel slows down too rapidly, so that the deceleration rate of that wheel exceeds a reference value, the control unit 72 determines that the slip ratio of the wheel is too large. The control unit then signals the shutoff valve 26 and the motor 60 to bring the valve 26 into the second closed position and to drive the hydraulic pump 58. The control unit 72 then energizes the control valve 36 to cause it to move into the second position, whereby the hydraulic pressure at the wheel cylinder 18 is released through the conduits 46, 50, and 54 toward the reservoir 56 to reduce the braking force. When the deceleration rate of the wheel becomes too small, requiring an increase in the braking force, the control unit 72 deenergizes the control valve 36 and thus moves it into the first position, so that the brake fluid under pressure from the pump 58 is supplied through the conduits 44, 40, and 46 to the conduit 30 to increment the hydraulic pressure at the wheel cylinder 18.

It this manner, the control unit 72 controls the valve 36 in accordance with the deceleration rate or slip ratio of the front right wheel to increment or decrement the wheel cylinder pressure so that the vehicle is braked without causing the wheel to skid. Antiskid control terminates when the vehicle speed becomes zero or when the brake sensor 82 senses that the brake pedal is released. The control unit then deenergizes the motor 60 and signals the shutoff valve 26 to return it to the normally-open first position and thus resume the fluid communication between the master cylinder 12 and the wheel cylinders.

The holding function and the malfunction alarm function of the braking system will be next described with reference to the flow diagram of FIG. 2 in conjunction with FIG. 1.

At function 100, the control unit 72 determines whether the actual wheel speed Vw is less than a predetermined speed $V_1$ (for example, $V_1=1$ km/h). If so, the control unit then determines at function 101 whether the brake pedal is depressed. If so, meaning that the vehicle is stopped, at function 102 the control unit sends a signal to the shutoff valve 26 to cause it to move into the closed second position. If there is no failure in the signal line 74 and the solenoid of the valve 26 so that the shutoff valve function properly, and when there is no leakage of brake fluid at the valves 26, 36 and 38, the hydraulic pressure at the wheel cylinders 18 and 20 is maintained upon movement of the shutoff valve 26 into the closed position. As a result, the vehicle is held immobile even though the operator releases the brake pedal. Thus, the holding function is achieved. In the case of a failure or malfunction of the components, such as a rupture of the line 74 or of the solenoid, or a leakage of brake fluid at any of the valves 26, 36 and 38, the hydraulic pressure at the wheel cylinders will be relieved thereby releasing the holding function. If the vehicle moves for any reason, such as because the vehicle is resting on an inclined road surface, the operator will easily recognize that there is a failure or malfunction in the components of the braking system.

At function 103, the control unit determines whether the operator has attempted operation to move the vehicle. In a vehicle having an automatic transmission with a torque converter, an affirmative determination is made when the shift lever is in the drive range position and when the accelerator pedal is depressed. In a manual transmission vehicle, affirmative determination may be made when the shift lever is in a drive gear position and the clutch is engaged to a predetermined degree.

If the determination at function 103 is affirmative, at function 104, the control unit then sends drive signals to the control valves 36 and 38. If the control valves 36 and 38 function properly and when there is no clogging of the conduits 50, 52, and 54, the pressure at the wheel cylinders 18 and 20 will be relieved to allow the vehicle to move immediately in response to the attempt by the operator to move the vehicle ahead or to the rear. Conversely, in the case of a failure or malfunction of the control valves 36 and 38, or clogging of the conduits 50, 52, and 54, the hydraulic pressure at the wheel cylinders will be maintained to keep the vehicle immobile until the shutoff valve 26 is opened at function 108, described later.

At function 105 a timer is set to measure the elapse of time after the control valves 36 and 38 receive the signals at function 104. Function 106 determines whether or not the elapsed time t is greater than a predetermined time period $t_1$ (for example, $t_1=0.5$ second). If the predetermined time $T_1$ has elapsed, the control unit terminates delivery of the drive signals to the control valves 36 and 38 at function 107 and then deenergizes the shutoff valve 26 at function 108 to reestablish fluid communication between the wheel cylinders and the master cylinder.

It should be appreciated that, when there is malfunction of the control valves 36 and 38 or clogging of the conduits 50, 52, and 54, the hydraulic pressure at the wheel cylinders 18 and 20 is not relieved rapidly by sending a signal from the control unit to the control valves 36 and 38 to move into the second position, but is released only upon deenergization of the shutoff valve 26, which takes place after a lapse of time $t_1$, for example, 0.5 second. Accordingly, the movement of the vehicle is restrained for time $t_1$ after the attempt by the operator to move the vehicle. This will make the operator aware that an unusual condition exists, and therefore, that one or more of the components of the braking system has failed or is malfunctioning. In this manner, each time the vehicle stops, the components of the braking system are checked and an indirect warning is provided in the case of a failure or malfunction of those components.

Figure 2:
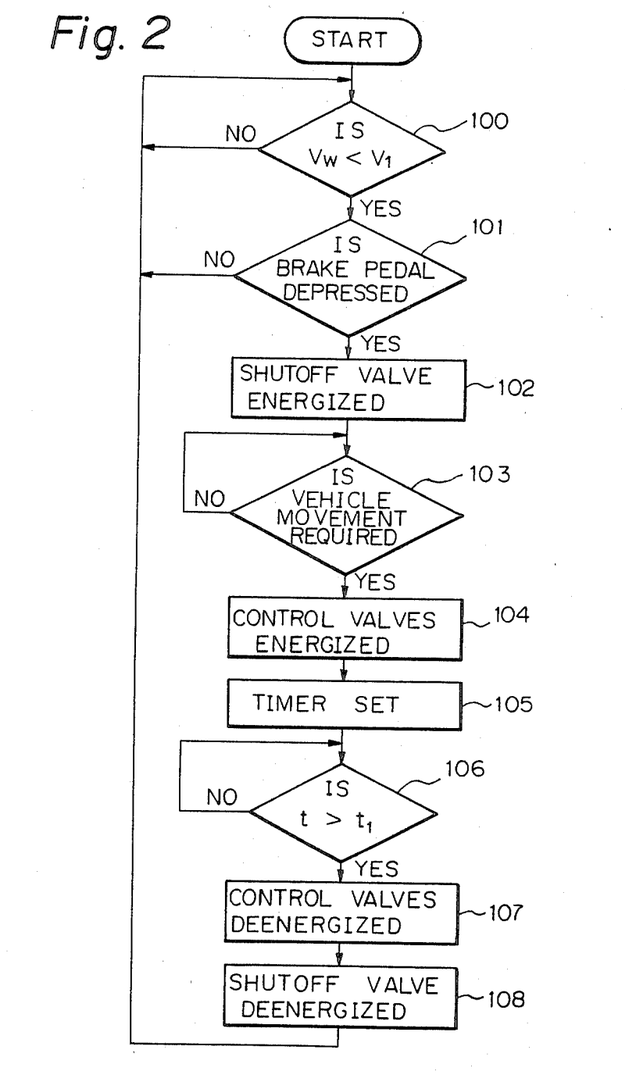
FIG. 2 is a flow diagram showing a mode of operation of the control unit of the embodiment shown in FIG. 1.
Figure 3:
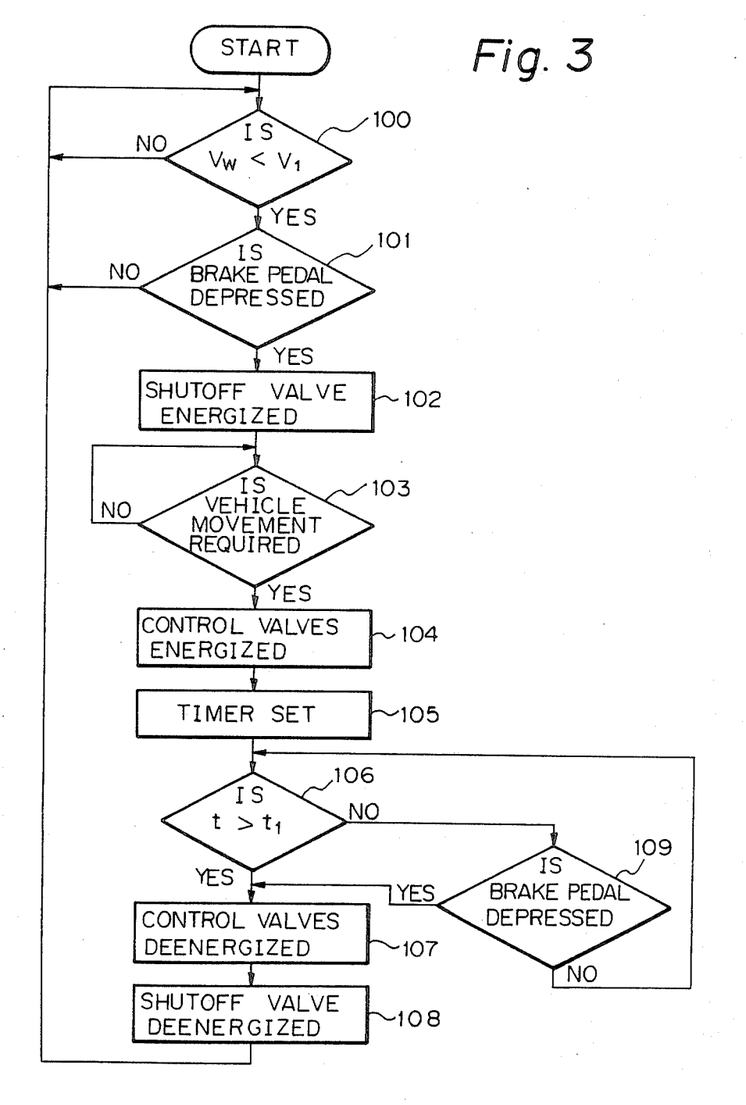
FIG. 3 is a flow diagram showing a modified mode of operation or the control unit.

FIG. 3 shows a modified version of the flow diagram shown in FIG. 2. Equivalent functions are shown by the same reference numerals, and therefore, a description thereof is omitted. The modified version includes an additional function 109 which is performed until the time $t_1$ has elapsed. At function 109, the control unit 72 determines whether the brake pedal is depressed. If not, function 106 is repeated. If so, then functions 107 and 108 are performed to deenergize the shutoff valve 26 and the control valves 36 and 38. This means that the shutoff valve 26 is opened and the control valves returned to the first position whenever the brake pedal is depressed after the operator has attempted to move the vehicle. Accordingly, the brake is applied upon actuation of the brake pedal even after the operation by the operator to move the vehicle.

In the holding mode of operation of the braking system, the hydraulic pressure at the wheel cylinders at the time of vehicle stoppage is maintained to immobilize the vehicle as above described. In a vehicle with an automatic transmission system, however, when the shift lever is shifted into a drive range position, a part of the engine output is transmitted to the drive wheels, tending to move the vehicle against the action of the braking force developed at the time of vehicle stoppage. In such a condition, it is desirable to increase the wheel cylinder pressure to develop an increased braking force. However, since the shutoff valve 26 is closed in the holding mode, to interrupt communication between the master cylinder and the wheel cylinders, the wheel cylinder pressure cannot be increased by application of the brake pedal.

Figure 4:
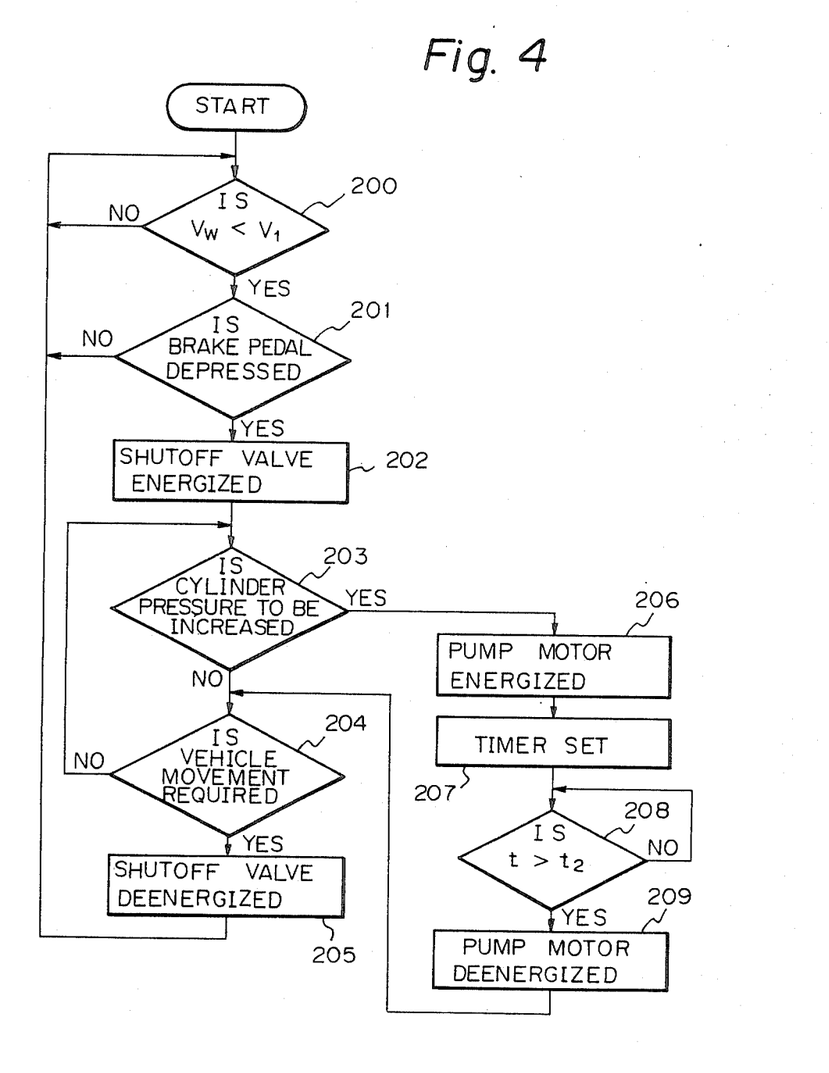
FIG. 4 is a flow diagram showing another mode of operation of the control unit.

To increment the wheel cylinder pressure in this situation, functions shown in the flow diagram of FIG. 4 may be carried out in combination with the operation shown in the flow diagram of FIG. 2 or 3. Referring to FIG. 4, functions 200 through 202 are similar to functions 100 through 102 of FIG. 2. At function 203, the control unit 72 determines whether a condition exists in which the wheel cylinder hydraulic pressure is to be incremented. This determination may be made based on the rotational speed of the wheels, so that an affirmative determination is made when either of the wheel sensors senses that a wheel is rotating due to inadequate braking force. If the hydraulic pressure at the wheel cylinders need not be increased, function 204 is performed to see whether the operator has attempted to move the vehicle. This function 204 may be carried out in a manner similar to function 103. If an attempt to move the vehicle has not been made, the control unit returns to function 203. If an attempt has been made, the control unit goes to function 205 to deenergize the shutoff valve 26, whereupon the wheel cylinder pressure is relieved to allow the vehicle to move. The control unit then returns to function 200.

If it is determined at function 203 that the pressure is to be incremented, the control unit then goes to function 206 to energize the electric motor 60 for the hydraulic pump 58. A timer is set at function 207 and an elapse of time is determined at function 208. When the time t becomes greater than a preset time $t_2$ (for example, one second), the motor is deenergized at function 209 and the control unit then goes to function 204. In this manner, the hydraulic pump 58 is driven for one second to supply brake fluid under pressure to the wheel cylinders 18 and 20, thereby providing an increased braking force. As a result, the vehicle is kept immobilized even though the operator has shifted the drive lever into the drive range position. It is understood that function 203 may be modified to result in an affirmative determination when the brake pedal is once released, and thereafter actuated, while functions 203 and 204 are successively repeated. Also, the electric motor 60 for the hydraulic pump 58 may be replaced with another type of motor such as a hydraulic motor driven by a pressurized fluid available in a power steering system.

Figure 5:
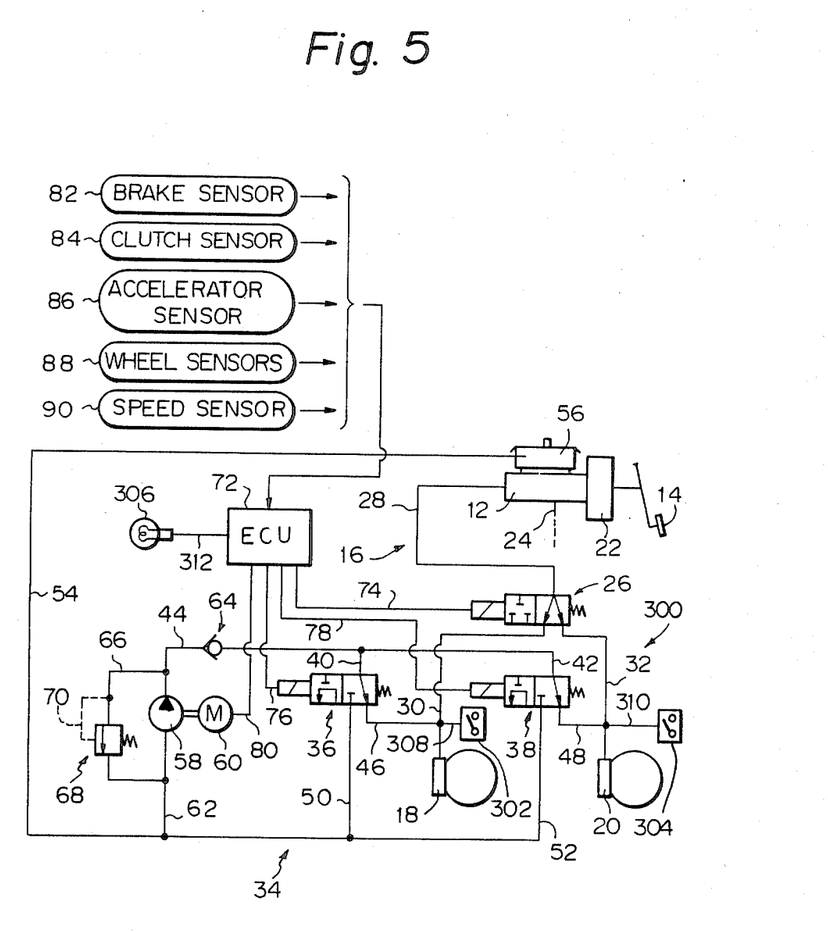
FIG. 5 is a diagrammatic representation of another embodiment of the invention.

FIG. 5 shows another embodiment of the invention. The braking system 300 shown in FIG. 5 differs from the system 10 shown in FIG. 1 in that it is provided with pressure switches 302 and 304 and alarm indicator means such as a warning lamp 306. Parts and members equivalent to those of FIG. 1 are indicated by like reference numerals and will not be described again. The pressure switches 302 and 304 are connected through conduits 308 and 310 to the conduit sections 30 and 32 and are designed to issue a signal to the control unit 72 over lines (not shown) when the hydraulic pressure at the wheel cylinders 18 and 20 exceeds a predetermined value in the range of 0.2 to 0.5 MPa. The warning lamp 306 is situated at a location such that it is readily visible to the operator. The lamp 306 is energized by the control unit 72 over line 312. Alternatively, the warning lamp may be substituted with an audible alarm means such as a warning buzzer.

Operation of the braking system 300 will be described below with reference to the flow diagram of FIG. 6 in conjunction with FIG. 5.

Figure 6:
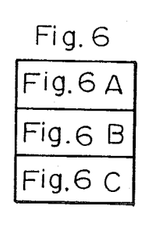
FIGS. 6A-6C are flow diagrams showing the operation of the control unit of the embodiment shown in FIG. 5.
Figure 6A:
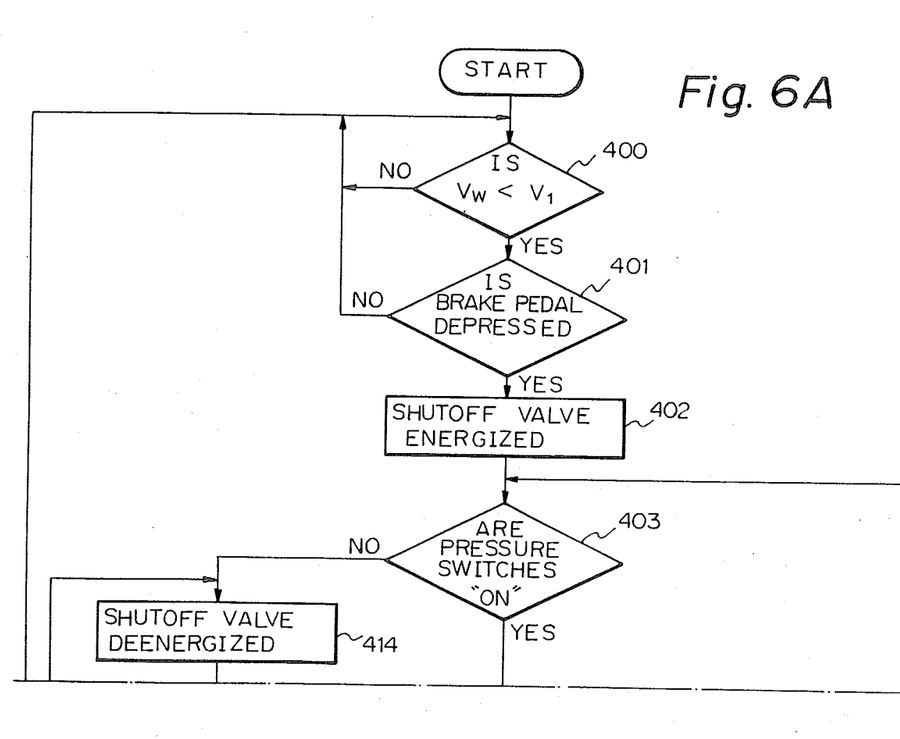

At function 400, the control unit 72 determines whether the wheel speed Vw is less than a predetermined speed $V_1$, for example, 1 km/h. If so, function 401 determines whether the brake pedal is actuated. If so, indicating that the vehicle is stopped, the control unit energizes the shutoff valve 26 to cause it to move into the closed second position. As a result, the pressure at the wheel cylinders is maintained to hold the vehicle immobile, even though the brake pedal is thereafter released.

At function 403, the control unit determines whether the pressure switches 302 and 304 are turned on. In the event that the solenoid-operated shutoff valve 26 does not function properly, so that an appropriate pressure is not maintained at the wheel cylinders, function 414 is performed to deenergize the shutoff valve 26 to connect the master cylinder with the wheel cylinders, and at function 415, the warning lamp 306 is energized to warn the operator that a proper pressure is not maintained at the wheel cylinders. The operator may then depresses the brake pedal again to hold the vehicle immobile.

If at function 403 the control unit senses a signal from the pressure switches 302 and 304 indicating that a proper pressure is established at the wheel cylinders, function 404 is performed to see whether a condition exists in which the wheel cylinder pressure is to be incremented. If so, function 417 energizes the electric motor 60 to drive the hydraulic pump 58, and at functions 418, 419, and 420 the pump is continued to be driven for a predetermined time $t_2$ (for example, one second) thereby increasing the pressure at the wheel cylinders. Accordingly, the braking force is increased to stop the vehicle.

Figure 6B:
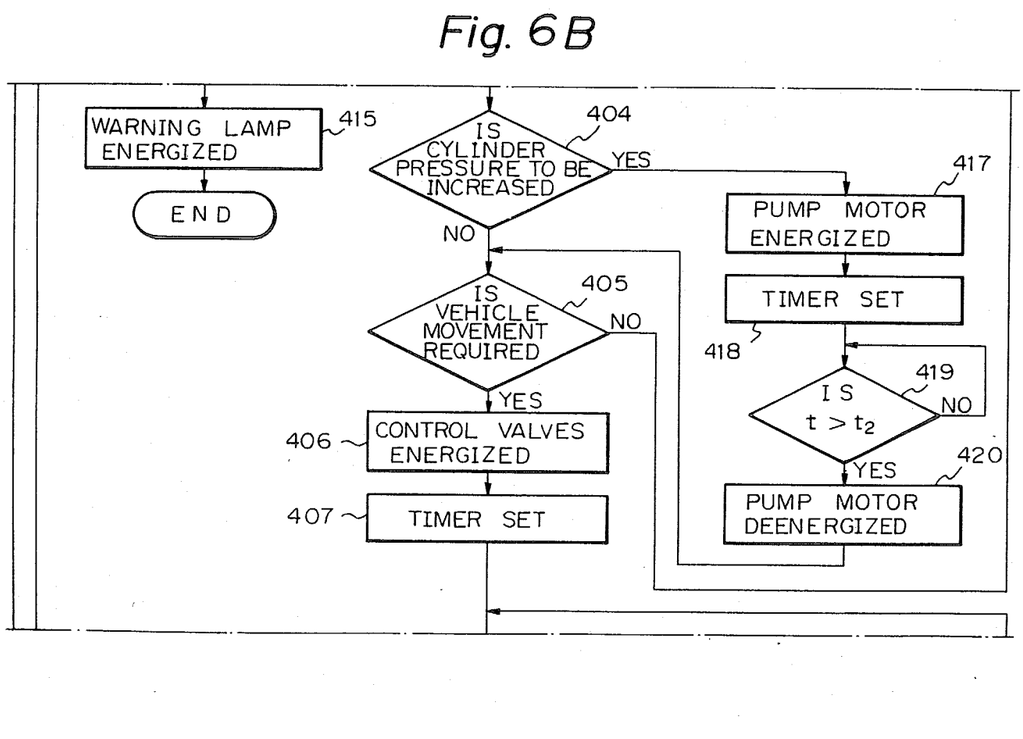

If function 404 determines that the wheel cylinder pressure need not be increased, function 405 is performed to determine whether the operator has attempted to move the vehicle. If not, the control unit returns to function 403. If so, at function 406 the control unit sends drive signals to the control valves 36 and 38 to check whether they are functioning properly. That is, at functions 407, 408, and 410, the drive signals are supplied to the control valves for a predetermined time $t_1$ of, for example, 0.5 second, in an attempt to relieve the wheel cylinder pressure. Function 909 is similar to function 109 shown in the flow diagram of FIG. 3 and serves to develop the braking force upon actuation of the brake pedal.

At function 411, the control unit determines whether the pressure switches 302 and 304 are turned ON. If the control valves 36 and 38 function properly and there is no clogging in the conduits 50, 52, and 54, so that the hydraulic pressure at the wheel cylinders has been released before function 411 is performed, the pressure switches 302 and 304 will not deliver a signal so that function 412 is performed to deenergize the shutoff valve 26 providing fluid communication between the master cylinder and the wheel cylinders.

Figure 6C:
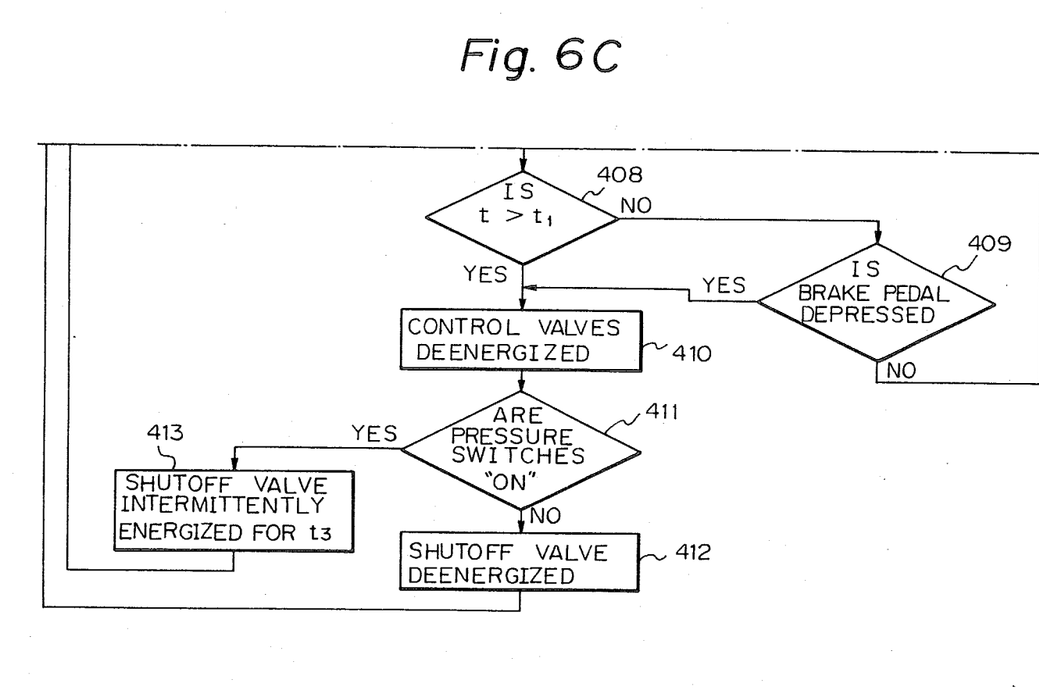

Conversely, in the event that the control valves 36 and 38 are malfunctioning or the conduits are clogged, the pressure at the wheel cylinders will not be released by energization for 0.5 second of the control valves 36 and 38, so that the pressure switches 302 and 304 are turned ON to issue signals. In that event, function 413 is performed in which a duty signal in the form of a discrete pulse series is applied to the shutoff valve 26 for a predetermined time $t_3$ in order to intermittently energize and alternately open and close the shutoff valve 26 for the duration $t_3$. It should be appreciated that by intermittent actuation of the shutoff valve 26 at function 413, the hydraulic pressure remaining at the wheel cylinders due to a malfunction or clogging will be released only gradually. This prevents any abrupt movement of the vehicle even though the accelerator pedal is pressed down prior to the fluid communication between the master cylinder and the wheel cylinders being fully re-established at the subsequent function 414.

After function 413, the shutoff valve 26 is deenergized at function 414 and the warning lamp 306 is energized at function 415. In this manner, a visible alarm is provided in this embodiment to positively warn the operator that there is a malfunction of the braking system.

Although the present invention has been described herein with reference to the specific embodiments thereof, it is understood that the present invention is not limited thereto and various changes and modifications may be made therein within the scope of the appended claims.

We claim:

1. A hydraulic braking system for a vehicle having at least one wheel with a brake, which comprises:
   (a) a master cylinder actuated by a vehicle operator to generate a hydraulic pressure;
   (b) a wheel cylinder operatively associated with the brake;
   (c) a hydraulic conduit connected between said master cylinder and said wheel cylinder for transmitting the hydraulic pressure generated at said master cylinder to said wheel cylinder to apply the brake;
   (d) a normally-open electromagnetic shutoff valve disposed in said hydraulic conduit for controlling the transmission of hydraulic pressure therethrough, said shutoff valve being responsive to a first electronic signal to interrupt fluid communication between said master cylinder and said wheel cylinder;
   (e) pressure modulator means, including a control valve, for modulating the hydraulic pressure at said wheel cylinder, said control valve being responsive to a second signal to relieve the hydraulic pressure at said wheel cylinder; and
   (f) electronic control means for controlling said shutoff valve and said control valve, said control means being operable to deliver said first signal to said shutoff valve in response to a condition in which the vehicle is to be maintained immobile, said control means being operable to thereafter deliver said second signal to said control valve for a predetermined time period in response to an operation by the operator to move the vehicle during the immobilized condition thereof and being operable to cease delivery of said first signal after termination of said second signal.

2. A hydraulic braking system according to claim 1, wherein said control means is operable to immediately cease delivery of said first and second signals whenever the master cylinder is actuated after the operation by the operator to move the vehicle.

3. A hydraulic braking system according to claim 1, wherein said pressure modulator means further comprises an electrically driven hydraulic pump for supplying a brake fluid under pressure to said wheel cylinder, and wherein said control means is operable to actuate said hydraulic pump for a predetermined duration in response to a condition in which the hydraulic pressure at said wheel cylinder is to be increased.

4. A hydraulic braking system for a vehicle having at least one wheel with a brake, which comprises:
   (a) a master cylinder actuated by a vehicle operator for generating a hydraulic pressure;
   (b) a wheel cylinder operatively associated with said brake;
   (c) a hydraulic conduit connecting said master cylinder with said wheel cylinder to transmit the hydraulic pressure generated at said master cylinder to said wheel cylinder to apply the brake;
   (d) a normally-open electromagnetic shutoff valve disposed in said hydraulic conduit for controlling the fluid communication therethrough, said shutoff valve being responsive to a first control electronic signal to shut off said hydraulic conduit;
   (e) pressure modulating means, including a control valve, for modulating the hydraulic pressure at said wheel cylinder, said control valve being operable to relieve the hydraulic pressure at said wheel cylinder in response to a second control signal;
   (f) detecting means for sensing the hydraulic pressure at said wheel cylinder and delivering a third signal in response to the hydraulic pressure at said wheel cylinder exceeding a predetermined level;
   (g) alarm indicator means for warning the operator of a failure or malfunction of one or more components of said braking system; and
   (h) electronic control means responsive to said third signal and to vehicle conditions for controlling said shutoff valve, control valve, and indicator means, said control means being operable to deliver said first control signal to said shutoff valve to close the shutoff valve and maintain hydraulic pressure at said wheel cylinder in response to a condition in which the vehicle is to be maintained immobile, said control means operating to thereafter deliver said second control signal to said control valve for a predetermined time period in an attempt to release the hydraulic pressure at the wheel cylinder in response to an operation by the operator to move the vehicle during the immobilized condition thereof, said control means operating to thereafter determine the presence or absence of said third signal and operating to actuate said alarm indicator means and to terminate delivery of said first signal in response to the presence of said third signal, said control means operating in the absence of said third signal to terminate delivery of said first signal without actuating the alarm indicator means.

5. A hydraulic braking system according to claim 4, wherein, after determination of the presence or absence of said third signal and in response to the presence of the third signal, said control means operates to intermittently deliver said first signal to said shutoff valve for a predetermined duration prior to termination of delivery of the first control signal, to gradually release the hydraulic pressure at the wheel cylinder, thereby preventing abrupt movement of the vehicle.

6. A hydraulic braking system according to claim 4, wherein said pressure modulator means further comprises an electrically driven hydraulic pump for supplying a brake fluid under pressure to said wheel cylinder, and wherein said control means is operable to actuate said hydraulic pump for a predetermined duration in response to a condition in which the hydraulic pressure at said cylinder is to be increased.

7. A hydraulic braking system according to claim 4, wherein said control means operates to immediately terminate delivery of said first control signal when the master cylinder is actuated after the operation by the operator to move the vehicle.

* * * * *